Jan. 6, 1959     L. BOOR     2,867,053
ARTICLE MOUNTING
Filed May 24, 1955

INVENTOR.
Ladislav Boor
BY
*W. J. Eccleston*
ATTORNEY

United States Patent Office 2,867,053
Patented Jan. 6, 1959

2,867,053

ARTICLE MOUNTING

Ladislav Boor, Philadelphia, Pa., assignor to the United States of America as represented by the Secretary of the Army Application May 24, 1955, Serial No. 510,876

2 Claims. (Cl. 41—35)

(Granted under Title 35, U. S. Code (1952), sec. 266)

The invention described herein may be manufactured and used by or for the Government for governmental purposes, without the payment to me of any royalty thereon.

This invention relates to mountings for articles and methods of mounting articles, and more particularly to mountings for permanently preserving and displaying articles having standard colors and finishes, and other standard samples, such as hardware, insignia, medals, and the like, and to methods of mounting, preserving and displaying such articles.

In the past it has been customary to mount and preserve such articles by embedding and completely enveloping them in a molded block of a clear, transparent plastic. In some cases the plastic has been initially in the form of a molding powder, and it has been molded around the article by means of heat and pressure. In other cases a mold has been partially filled with a liquid casting resin, this resin has been partially hardened before the article was placed therein, next the balance of the liquid resin has been poured in to fill the mold, and then the entire mass of resin in the mold has been cured to form a solid block containing the article.

The products obtained by these prior art procedures were often defective. It was difficult to avoid the formation of bubbles in the interior of the plastic block. In the casting method it was difficult to position the article properly, and in the molding method there was a tendency for the article to become tilted out of its desired position. Some of the plastic compositions employed contained certain ingredients, such as chemical accelerators, which caused discoloration of the metal finishes of the articles under the high temperatures developed during curing operations. It was found that articles having surfaces composed of copper or copper alloys, such as brass and bronze, often became so discolored that they were unsuitable for use as color standards. Furthermore, it was necessary to polish the surface of the plastic block, and this operation inevitably produced a positive curvature of the outside surface thereof. As a result of its surface curvature and its contact with the article, the plastic block became in effect a magnifying lens, which distorted the view of the article preserved in the interior of the block, and magnified all scratches and any other imperfections present in the surface of the article. In addition to the defects often found in the products of the prior art methods, such methods were unsatisfactory because they were time consuming and relatively expensive to perform.

An object of this invention is to provide new and improved mountings for articles, and methods of mounting such articles.

Another object of the invention is to provide new and improved mountings for permanently preserving and displaying standard samples of hardware, insignia, medals, and the like, and methods of mounting, preserving and displaying such articles.

A complete understanding of the invention may be obtained from the following detailed description thereof, taken in conjunction with the appended drawing, in which.

Figure 1:
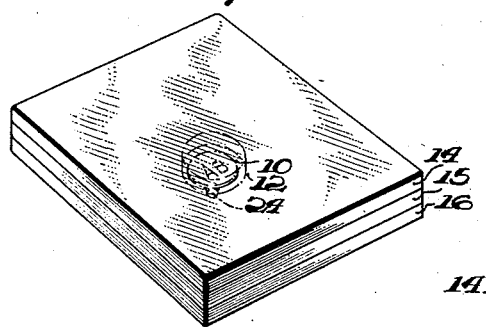
Fig. 1 is a perspective view of a mounted insigne which has been mounted in accordance with a method embodying the invention.
Figure 3:
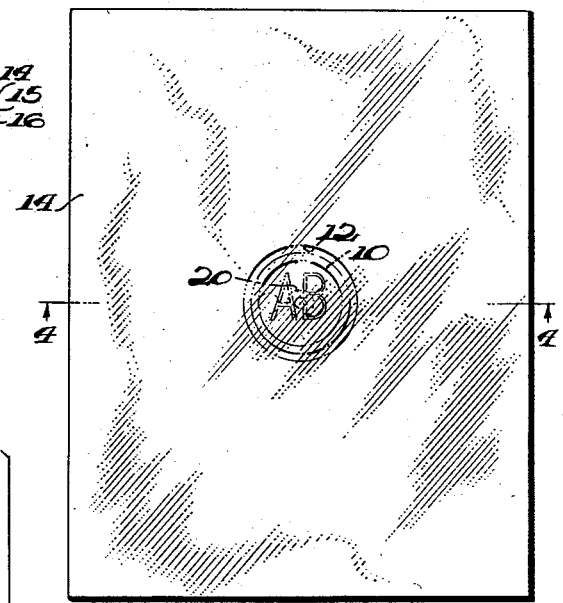
Fig. 3 is an enlarged plan view of the mounted insigne illustrated in Figs. 1 and 2.
Figure 2:
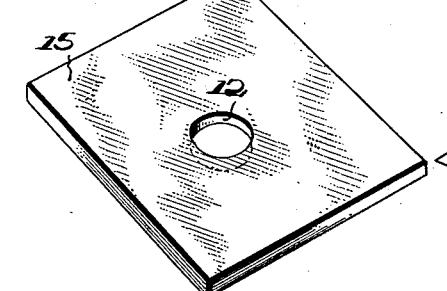
Fig. 2 is an exploded perspective view of the mounted insigne illustrated in Fig. 1.
Figure 2:
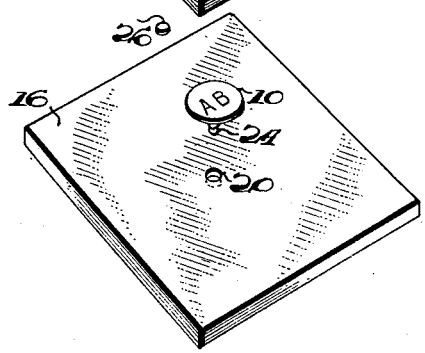
Figure 4:
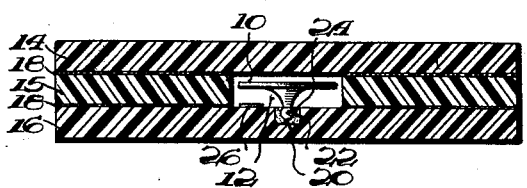
Fig. 4 is a vertical section taken along line 4—4 of Fig. 3.

In Figs. 1, 2, 3 and 4, a circular, metallic insigne 10 is shown mounted within an interior hole 12 formed in a unitary, transparent, block-like container or receptacle constructed from three preformed plastic plates, designated 14, 15 and 16, which are sandwiched together and permanently united to form the container or receptacle. These plates are coextensive in length and width, and they are equal in thickness. As is best shown in Fig. 4, the plate 14 is the top or cover plate of the receptacle, the plate 15 is the middle plate, and the plate 16 is the bottom or base plate of the receptacle. The plates 14, 15 and 16 are preferably composed of a clear, transparent, inert, relatively rigid, thermoplastic compound, such as a polymerized methyl methacrylate compound. These three plates may be secured together by a plurality of intermediate layers 18—18 of a compatible, transparent adhesive. In the assembled receptacle, the base plate 16 and the middle plate 15 superposed thereon together form a clear, transparent block having a cavity formed in one face thereof by the hole 12. The top plate 14 functions as a cover for this receptacle. The assembled container or receptacle is permanently, hermetically sealed, and it is transparent on all of its sides for the purpose of displaying all sides of the mounted insigne 10 to an observer.

The three plates 14, 15 and 16 may be formed by cutting three identical rectangular sections from the same flat plastic sheet. Then the hole 12 may be formed in the center of the middle plate 15 by boring or routing out a section sufficiently large to accommodate the article to be mounted. It should be observed that the hole 12 is made slightly larger in cross-sectional area than is necessary to accommodate the maximum lateral dimensions of the circular insigne 10, which in this case is its diameter, so that the side walls of the hole 12 are spaced from the sides of the insigne 10 and have no contact therewith. In order to simplify the structure and the process of manufacture, it is desirable to have the hole 12 extend transversely through the plate 15 from one side to the other thereof, so that this hole may be formed by merely boring or routing out the plate 15.

The insigne 10 is permanently mounted and centrally positioned within the transverse hole 12 in the middle plate 15 by anchoring this insigne to the center of the bottom plate 16. As shown in Fig. 4, a small recess 20 drilled in the center of the plate 16 is filled with a charge of a suitable cement 22 into which a projecting portion 24 of the insigne 10 is inserted. Articles to be mounted, such as the insigne 10, are usually provided with a suitable loop or fastener, such as the projecting portion 24 thereof. In the absence of such loop or fastener, a small portion of the article to be mounted may be cemented directly to the bottom plate 16. When the middle plate 15 is superposed upon the base plate 16 to form the shallow, block-like, transparent receptacle for the insigne, the small recess 20 is countersunk centrally in the bottom of the cavity formed by the hole 12.

It should be observed that the insigne 10 is spaced from the top plate 14 as well as from the surrounding wall of the transverse hole 12 in the middle plate 15. In order to achieve this result, the plate 15 must be at least slightly thicker than the insignia 10, and it is acceptable for the plate 15 to be considerably thicker than the insigne 10. In one successful embodiment of the invention, the three plastic plates corresponding to the plastic plates 14, 15 and 16 illustrated in the drawing were ¼ inch thick and they were 5 inches long by 4 inches wide. Such plates were considered suitable for mounting the hardware, insignia, medals, etc., contemplated in the present invention. Although in the drawing the three plates 14, 15 and 16 are rectangular in configuration, it is obvious that they may also be circular, square, or have any other desired configuration. Furthermore, the relative thickness of the plates may be varied as desired, provided that the middle plate 15 is sufficiently thick to accommodate substantially the entire insigne 10 within the hole 12.

In order to remove any moisture initially present in the air space surrounding the insigne 10 in the hole 12, a small quantity of a suitable powdered desiccant, such as silica gell, in the form of a tablet 26 may be placed therein. The tablet 26 may also contain an antioxidant to absorb most of the oxygen in the hole 12. Thus, the two most active deteriorative agents, which are the moisture and the oxygen, may be prevented from attacking the insigne, and the dry gas remaining in contact with the preserved article is essentially only nitrogen.

In the performance of one method embodying the invention, the three plastic plates 14, 15 and 16 are first cut from a large flat sheet composed of a clear, transparent plastic compound, such as a polymerized methyl methacrylate compound. Then a portion of the middle plate 15 is bored or routed out to form the hole 12 therein, and the small recess 20 is drilled in the base plate 16. The recess 20 is filled with a charge of the cement 22, and the insignia 10 is anchored therein by inserting its projecting portion 24 into the cement 22. Time is allowed for the cement 22 to harden and thereby hold the insigne 10 erect and properly positioned protruding upwardly from the center of the bottom plate 16. Meanwhile the layers 18—18 of transparent adhesive are interposed between the plates in any manner appropriate for the sequence of steps selected. For example, the adhesive may be placed on opposite sides of the middle plate 15, or it may be placed on the upper side of the middle plate 15 and the upper side of the base plate 16. Next, the middle plate 15 is superimposed upon the bottom plate 16 to form a shallow, block-like, transparent receptacle for the insigne 10. The tablet 26 of desiccant and antioxidant is placed within the cavity formed in this receptacle by the hole 12 in conjunction with the base plate 16. The top plate 14 is then superimposed upon the middle plate 15 to form a cover for the receptacle. Finally, the plates 14, 15 and 16 are pressed together, and after the adhesive layers 18—18 have hardened, the insigne 10 is permanently, hermetically sealed within the interior hole 12 in this transparent receptacle.

In another and less preferred embodiment of the invention, the article to be mounted is encased within a substantially solid, block-like, transparent plastic container or receptacle constructed from only two plastic plates.

Figure 5:
Fig. 5 is a vertical section of a mounted insigne which has been mounted in accordance with another method embodying the invention.

As shown in Fig. 5, an insigne 30 is mounted within a shallow cavity 32 formed in a base plate 34 and covered by a top plate 36. The receptacle formed by the plates 34 and 36 includes a clear, transparent plastic block having the shallow cavity 32 formed in one face thereof to receive the insigne 30 therein. The top plate 36 functions as a cover for this receptacle. The plates 34 and 36 are composed of a clear, transparent plastic compound, such as a polymerized methyl methacrylate compound, and they are secured together by an intermediate layer 38 of a compatible, transparent adhesive.

The base plate 34 and the top plate 36 are coextensive in length and width. Although the base plate 34 appears in the drawing to be considerably thicker than the top plate 36, the relative thickness of these plates may be varied as desired. It is most convenient for the base plate 34 to be sufficiently thick to accommodate substantially the entire insigne 30 within the cavity 32 formed therein, and for the cavity to be formed only in the base plate 34 rather than in both of the plates. It is preferred for the top plate 36 to be perfectly flat and to be flush with the top of the cavity 32 when the two plates are assembled.

The cavity 32 is formed in the center of the upper surface of the base plate 34. The depth of the cavity 32 must be not less than the height of the article to be mounted therein. The cross sectional area of the cavity 32 should be at least as large or slightly larger than is necessary to accommodate the maximum lateral dimensions of the article, which in the case of the circular insigne 30 is its diameter. The insigne 30 may be mounted and centrally positioned within the cavity 32 by anchoring the insigne 30 to the center of the bottom of the cavity 32. This may be accomplished by drilling a small countersunk recess 40 in the center of the bottom of the cavity 32, filling the recess 40 with a charge of a suitable cement 42, and inserting a projecting portion 44 of the insigne 30 into the cement 38. A tablet 46 composed of a suitable powdered desiccant, such as silica gel, is placed within the cavity 32 to absorb any moisture initially present when the two plates 34 and 36 are assembled. An antioxidant may also be included in the tablet 46 to remove oxygen from the cavity 32.

In the performance of another method embodying the invention, the two plastic plates 34 and 36 may be cut separately from two large flat sheets having the required thickness and composed of a clear, transparent plastic compound, such as a polymerized methyl methacrylate compound. Of course, in some cases the plates 34 and 36 may be equal in thickness, and in such cases they may be formed by cutting two identical sections from the same large sheet. However, usually the base plate 34 is thicker than the top plate 36, and it may be approximately twice as thick, as shown in Fig. 5. The cavity 32 and the small countersunk recess 40 may be bored or drilled in the base plate 34. Alternatively, the plates 34 and 36 may be formed by a molding or casting operation in which the cavity 32 and the recess 40 are formed simultaneously. However, in order to simplify the structure of the product and the method of production, and to reduce production costs, it is preferred to form the plastic plates 34 and 36 by merely cutting or stamping them, rather than by casting or molding them.

The subsequent steps of this method are similar to the corresponding steps described in the first embodiment of the invention. A charge of the cement 42 is placed in the countersunk recess 40, and the insigne 30 is anchored therein by inserting its projecting portion 44 into the cement 42. The intermediate layer 38 of transparent adhesive is interposed between the plates 34 and 36, and the tablet 46 containing the desiccant and the antioxidant is placed into the cavity 32. The top plate 36 is superimposed upon the shallow, block-like, transparent receptacle formed by the bottom plate 34. Finally, the plates 34 and 36 are pressed together, thereby permanently, hermetically sealing the insigne 30 within the receptacle.

In the above-described embodiments of the invention, the transparent plastic plates are secured together by means of a transparent adhesive, but the invention is not limited thereto. The plastic plates, which have been heretofore described as preferably composed of a thermoplastic compound, may be fused together by heat, or they may be united by any conventional lamination procedure.

As a matter of convenience, the invention has been illustrated and described with reference to the mounting and preservation of insignia, and it has been stated that the invention is considered particularly useful for the preservation of standard samples of hardware, insignia, medals, and the like. The invention is also applicable to the preservation of botanical, entomological, mineralogical and zoological specimens, such as flowers, insects, jewels and the like. Of course, the invention is useful for mounting various personal items, such as keepsakes, relics, and souvenirs. However, the advantages of the invention may be appreciated to the greatest degree in the preservation of articles on a mass production basis. For example, in the production of a large number of standard samples mounted in accordance with the invention, for distribution to inspection personnel at numerous industrial locations for the purpose of making quality control comparisons with production items.

It should be understood that the invention may be modified to suit special requirements without departing from the spirit and scope thereof.

I claim:

1. A transparent protective mounting block for preserving and displaying an article, comprising a clear transparent plastic base plate having smooth and plain upper and lower surfaces, means for fixedly mounting said article on the upper surface of said base plate, a clear transparent plastic intermediate plate of a thickness not less than the height of said article above the surface of said base plate and having smooth and plain upper and lower surfaces, said intermediate plate having an aperture therethrough for receiving said article, said aperture being aligned with said mounting means and being sufficiently large in area to admit said article, and a clear transparent plastic top plate having smooth and plain upper and lower surfaces; said base plate, intermediate plate and top plate being hermetically secured together to form a transparent block enclosing said article.

2. A device of the class described comprising a protective mounting block, said block comprising a clear transparent plastic base plate having smooth and plain upper and lower surfaces, an article fixedly mounted on the upper surface of said base plate, a clear transparent plastic intermediate plate of a thickness not less than the height of said article above the surface of said base plate and having smooth and plain upper and lower surfaces, said intermediate plate having an aperture therethrough in which the article is located, a desiccant disposed in said aperture adjacent the article, and a clear transparent plastic top plate having smooth and plain upper and lower surfaces; said base plate, intermediate plate and top plate being hermetically secured together to form a transparent block enclosing said article.

References Cited in the file of this patent

UNITED STATES PATENTS

| | | |
|---|---|---|
| 1,532,831 | Mastin | Apr. 7, 1925 |
| 2,313,766 | Pfansteil | Mar. 16, 1943 |
| 2,330,497 | Larmour | Sept. 28, 1943 |
| 2,440,205 | McLain | Apr. 20, 1948 |
| 2,445,152 | Poole | July 13, 1948 |
| 2,459,400 | Williams | Jan. 18, 1949 |
| 2,497,203 | Bennett | Feb. 14, 1950 |
| 2,609,278 | Eyles | Sept. 2, 1952 |